UNITED STATES PATENT OFFICE.

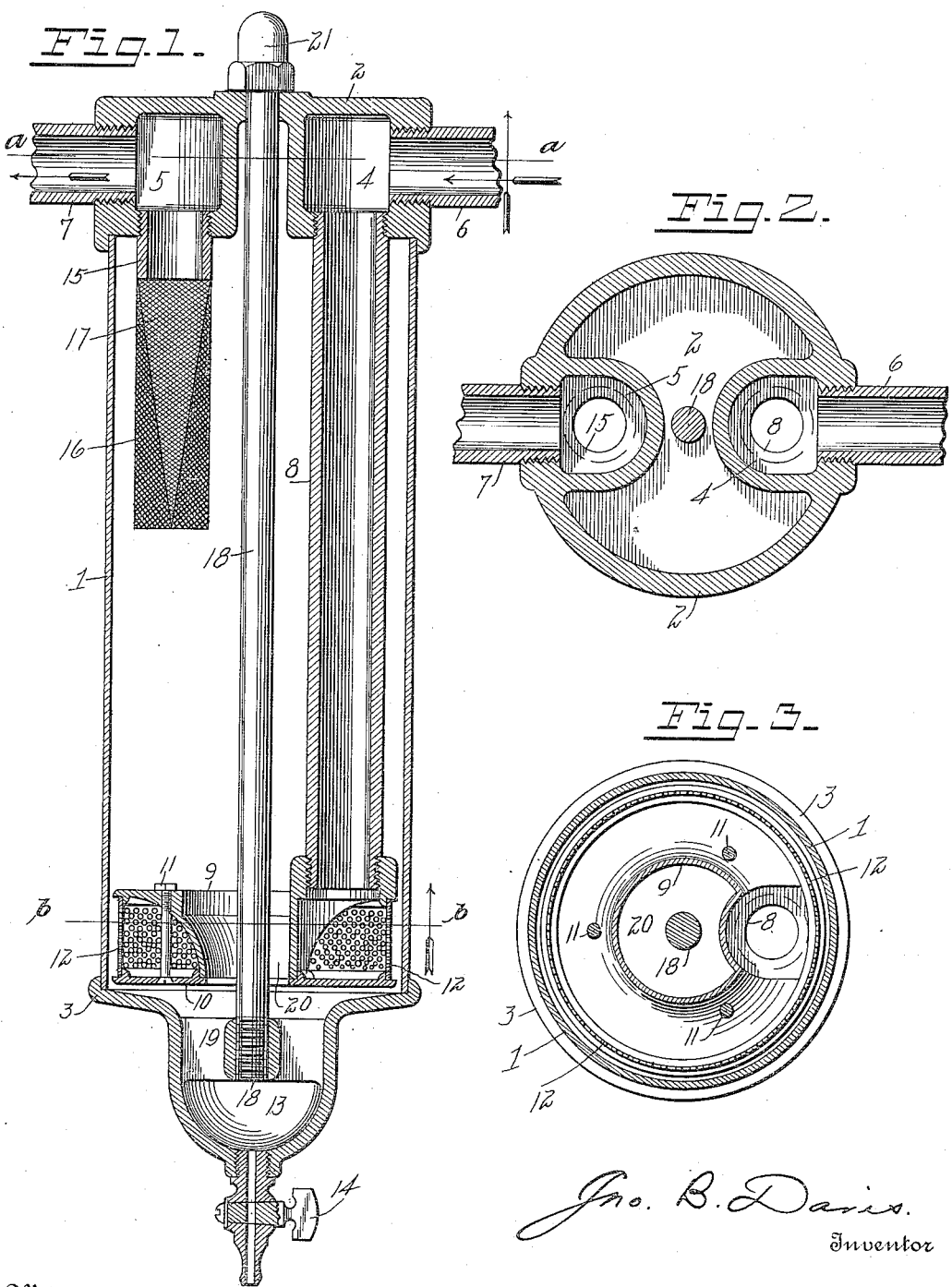

JOHN B. DAVIS, OF DAYTON, OHIO, ASSIGNOR TO THE AMERICAN OIL PUMP & TANK CO., OF DAYTON, OHIO, A CORPORATION OF OHIO.

APPARATUS FOR SEPARATING WATER FROM OILS.

995,402.   Specification of Letters Patent.   Patented June 13, 1911.

Application filed April 23, 1910.   Serial No. 557,149.

*To all whom it may concern:*

Be it known that I, JOHN B. DAVIS, a citizen of the United States, residing at Dayton, in the county of Montgomery and State of Ohio, have invented certain new and useful Improvements in Apparatus for Separating Water from Oils; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in apparatus for separating water from oils, such as gasolene and other oils.

The object of the invention is to provide a separator in which the oil is subjected to the least possible agitation. To this end the separating chamber is located at the bottom of the apparatus and acts as a baffle to stop the agitation of the oil fed thereto from the upper end of the cylinder. When the oil reaches the separating chamber it is in a substantially quiescent state. After passing from the separator the oil rises within the cylinder and the water passes by gravity below the cylinder.

In the accompanying drawings Figure 1 is a vertical longitudinal sectional view through the apparatus. Fig. 2 is a sectional view on the line *a—a* of Fig. 1. Fig. 3 is a sectional view on the line *b—b* of Fig. 1.

Throughout the specification and drawings similar reference characters indicate corresponding parts.

Referring to the drawings 1 designates an elongated cylinder closed at both ends; at the upper end by a casting forming a cap 2, and at the lower end by a casting forming a base portion 3, providing a chamber 13. The cap 2 has screw threaded apertures for the insertion of pipes 6 and 7 through which the oil passes to and from the apparatus. The said cap is provided with an inlet chamber 4 and an outlet chamber 5 with which the aforesaid pipes communicate. These chambers 4 and 5 are walled from each other and are therefore non-communicative.

Extending downwardly from the inlet chamber 4 is a pipe 8 at the lower end of which is a separating chamber formed by upper and lower imperforate plates 9 and 10 which are held together by a suitable number of bolts 11. The chamber thus formed is inclosed on its outer side by a cylindrical screen 12 which is slightly less than the diameter of the cylinder 1 in order that there may be suitable space for the passage of the oil from said chamber to the interior of the cylinder. The inner side of the said chamber is inclosed by a downwardly deflected imperforate portion of the top plate 9, thereby forming an axial opening 20. It will be observed that the plates 9 and 10 thus forming the imperforate portion of the separating chamber are supported upon the lower end of the pipe 8 in the lower end of the cylinder, and that the oil passing into the separator is directed into said chamber, and is baffled by the imperforate walls thereof and caused to assume a substantially quiescent state. The base portion 3 lies below the separating chamber and terminates in a cup extension which provides the chamber 13 hereinbefore referred to, for the reception of the water which has been separated from the oil. The chamber 13 is provided with a drain cock 14 through which the water is removed from the apparatus.

Extending downwardly from the outlet chamber 5 is a nipple 15 to which is secured an outer cylindrical screen 16 and an inner conical screen 17 through which the gasolene or oil passes upwardly to chamber 5.

The cap 2 and the base 3 are rigidly secured against the ends of the cylinder by means of a bolt 18, the lower end of which is screw threaded and connects with a spider 19 integrally joined to the base portion 3. The bolt 18 passes through an axial opening 20 of the separating chamber, and through an opening in the cap 2 and is fitted with a cap nut 21.

The gasolene or other oil, as before stated, passes into the apparatus through the inlet pipe 6 directly to the chamber 4, and downwardly through the pipe 8 to the separating chamber where its agitation is materially checked or decreased. The oil passes through the screen 12 to the interior of the cylinder 1 and rises therein while the water becomes separated from the oil by gravity and falls to the chamber 13. In other words, the gasolene passing through the separating chamber is practically dominant, and any water that may be commingled with the gasolene will fall to the bottom owing to its high specific gravity.

I claim:

1. In an oil and water separator, the combination with a cylinder and induction and eduction pipes leading to and therefrom, of a water receptacle at the lower end of said cylinder, a separating chamber inclosed by a surrounding screen and serving to baffle the oil introduced thereto, a pipe on the interior of the cylinder through which the oil is conducted to said separating chamber, and a screen-inclosed passage through which the oil is conducted from the apparatus after passing from the separating chamber, substantially as specified.

2. In an oil and water separator, the combination with a cylinder having inlet and outlet chambers and pipes communicating therewith, of a base providing a water chamber at one end of said cylinder, a separating chamber inclosed by a screen and located above said water chamber, said separating chamber serving to lessen the agitation of the oil fed thereto, a feed pipe extending from the inlet chamber to the separating chamber, and screens extending from the entrance of the outlet chamber on the interior of the cylinder and through which the oil enters said outlet chamber after passing from the separating chamber, substantially as specified.

3. In an oil and water separator, the combination with a cylinder having inlet and outlet chambers at one end and a water chamber at the other end, of a separating chamber within said cylinder and in which the agitation of the oil is checked, said chamber having its circumference inclosed by a screen, a pipe extending substantially the length of the cylinder and forming a passage for the oil from the inlet chamber to the separating chamber, an apertured extension communicating with the outlet chamber and a cylindrical screen joined to said apertured extension and through which the oil passes to said outlet chamber after passing from the separating chamber, substantially as specified.

4. In an oil and water separator, a cylinder, a cap on one end thereof having two non-communicating chambers, one being the inlet and the other the outlet chamber, a base on the other end of said cylinder providing a water chamber, a separating chamber above said water chamber and inclosed at its circumference by a screen, said screen lying inwardly from the inner side of the cylinder a sufficient distance to provide an annular space between the cylinder and the screen, a pipe on the interior of the cylinder affording a communication between the inlet chamber and the separating chamber, said pipe also supporting the separating chamber, an apertured extension on the interior of the cylinder affording a communication between the cylinder and the outlet chamber, and a screen attached to said apertured extension and extending substantially midway the length of the cylinder, substantially as specified.

5. In an oil and water separator, the combination with a cylinder having a water receptacle at its lower end, and inlet and outlet chambers at its upper end with induction and eduction pipes extending therefrom, of a separating chamber within said cylinder, the inner circumference, the top and bottom of which is inclosed by imperforate walls, and the outer circumference of which is inclosed by a surrounding screen, whereby the oil entering said chamber is baffled by the said imperforate walls thereof and is caused to pass from said chamber to the cylinder through said screen, and an induction pipe extending from the inlet chamber of the cylinder to the separating chamber, substantially as specified.

In testimony whereof I affix my signature, in presence of two witnesses.

JOHN B. DAVIS.

Witnesses:
R. J. McCarty,
Matthew Siebler.